A. W. SCHOENHEIT.
CLOSURE FOR RECEPTACLES.
APPLICATION FILED MAR. 31, 1914.
1,157,591.
Patented Oct. 19, 1915.
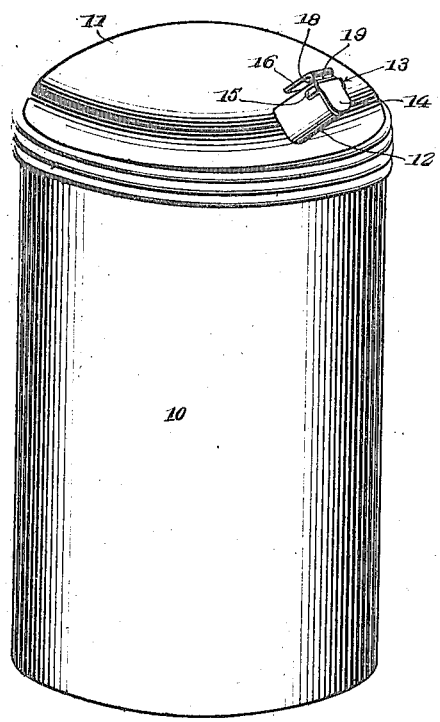
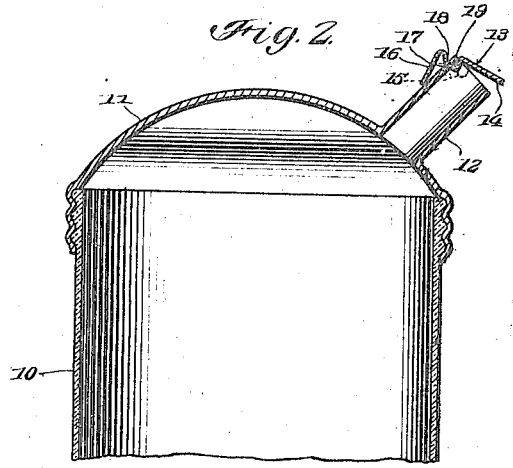
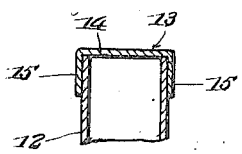
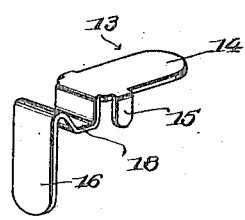
Inventor
A. W. Schoenheit,
Witnesses
By Victor J. Evans
Attorney

UNITED STATES PATENT OFFICE.

AUGUST W. SCHOENHEIT, OF PITTSBURGH, PENNSYLVANIA.

CLOSURE FOR RECEPTACLES.

1,157,591.     Specification of Letters Patent.     Patented Oct. 19, 1915.

Application filed March 31, 1914. Serial No. 828,524.

*To all whom it may concern:*

Be it known that I, AUGUST W. SCHOENHEIT, a citizen of the United States, residing at Pittsburgh, in the county of Allegheny and State of Pennsylvania, have invented new and useful Improvements in Closures for Receptacles, of which the following is a specification.

An object of the invention is to provide a closure for receptacles such as sugar bowls and the like and in which it is desired to provide a closure which will keep the contents of the receptacle in a clean, sanitary and dry condition and whereby the contents of the receptacle can be readily removed therefrom when desired.

The invention contemplates among other features the provision of a closure member for threaded or other engagement with the mouth of the vessel or receptacle, said closure member being provided with a suitable spout having a lid mounted to swing thereon and which normally closes the spout, the said lid being adapted to be swung to an open position when engaged by the contents of the receptacle upon tilting the receptacle to pour the contents through the spout and the movement of the lid upon the spout being limited to govern and control the removal of the contents of the receptacle therefrom.

In the further disclosure of the invention reference is to be had to the accompanying drawings, constituting a part of this specification, in which similar characters of reference denote corresponding parts in all the views, and in which, Figure 1 is a perspective view of the closure showing the same applied to a receptacle, the lid being shown in closed position. Fig. 2 is a vertical sectional view taken through the structure shown in Fig. 1 with the lid shown in open position. Fig. 3 is a vertical transverse sectional view taken through the spout and lid, and Fig. 4 is a perspective view of the lid removed from the spout.

Referring more particularly to the views I disclose a receptacle 10 adapted to contain sugar or some other powdered substance such as a condiment or the like, and which receptacle has its mouth closed by a closure member 11, preferably having threaded engagement with the receptacle 10. Supported on the closure member 11 and projecting upwardly at an incline to the upper face of the closure member is a tubular spout 12 preferably having its open end extending beyond the vertical edge of the closure member 11 and mounted to swing upon the spout 12 to normally close the same is a lid 13.

The lid 13 consists more particularly of a single piece of material which is bent to provide a plate 14 having guide lugs 15 struck downwardly from opposite edges thereof, said plate 14 at its rear end terminating in a tongue 16 adapted to pass loosely through a slot 17 formed in the spout 12 adjacent its mouth, with the said tongue 16 at the point of passing through the slot 17 being bent in a substantially U-shape form to provide a hinge member 18 in which a transverse bar or portion 19 of the spout 12 is adapted to lie as shown. Now when the receptacle 10 is in an upright position it will be apparent, by referring to the views, that the lid 13 will be in closed position upon the spout, the free end of the tongue 16 at this time being spaced from the rear face of the spout. Now when the receptacle 10 is tilted into a pouring position, the contents of the receptacle passing into the spout 12 will bear against the inner face of the plate 14, constituting a part of the lid 13, and will swing the lid into open position as shown, so that the contents of the receptacle will pour from the spout 12 and will not strike the edge of the closure member for the reason that the free end of the spout extends outwardly beyond the edge of the closure member. It will also be noted that when the lid 13 swings into open position the free end of the tongue 16 will engage the rear face of the spout thus limiting the open movement of the lid and the guide lugs 15, at all times bearing against the sides of the spout will properly hold the lid upon the spout so that when the receptacle is returned to an upright position the lid will gravitate into closed position and will be guided into position and close the spout by the said guide lugs 15.

As mentioned heretofore the closure set forth can be used in connection with receptacles adapted to contain various kinds of powdered substances and may also be used in connection with receptacles adapted to contain fluids although I particularly employ my device for sugar bowls and the like.

With a construction of the character described the contents of the receptacle will be kept in a dry clean state and the amount of sugar or other substance to be moved or poured from the receptacle can be readily governed by tilting the receptacle to a greater or less degree when it is desired to remove some of the contents contained therefrom.

Having thus described my invention, what I claim is:—

1. In combination with a spout of a receptacle, said spout having a horizontal slot, a lid for the mouth of the spout, said lid consisting of a plate, spaced depending guide lugs struck from the plate, a rearwardly extending tongue formed with the plate, and an intermediate downwardly struck horizontal portion lying between the tongue and the plate and passing through the horizontal slot of the spout, said tongue engaging the outside of the spout to limit the swinging movement of the lid, with the guide lugs bearing against the sides of the spout and guiding the lid in its swinging movement.

2. In combination with a spout of a receptacle, said spout having a horizontal slot, a lid for the mouth of the spout, said lid consisting of a plate, spaced depending guide lugs struck from the plate, a rearwardly extending tongue formed with the plate and an intermediate downwardly struck horizontal portion lying between the tongue and the plate and passing through the horizontal slot of the spout, said tongue engaging the outside of the spout being adapted to limit the swinging movement of the lid, with the guide lugs bearing against the sides of the spout and guiding the lid in its swinging movement, said horizontal downwardly struck portion extending parallel to the plate and said tongue extending laterally to the plate and the downwardly struck portion.

3. The combination with a spout for receptacles, said spout having a horizontal slot of a lid for closing the mouth of the spout comprising a plate arranged to lie flat on the end of the spout, an angular extension on the lid passing through said slot, an operating tongue on the extension arranged to engage the spout to limit the upward movement of the lid and means carried by the lid for guiding the movement of the plate on the spout, said means being continuously in engagement with the spout.

In testimony whereof I affix my signature in presence of two witnesses.

AUGUST W. SCHOENHEIT.

Witnesses:
IDA L. SHERRER,
J. W. SHERRER.